3,317,442
PARTICLE BOARD COMPRISING MAGNESIA-BASE CEMENT AND A POLYELECTROLYTE

James A. Clarke, Lake Jackson, Tex., assignor to The Dow Chemical Company, Midland, Mich., a corporation of Delaware
No Drawing. Filed Feb. 4, 1966, Ser. No. 525,130
13 Claims. (Cl. 260—9)

This application is a continuation-in-part of my application, Ser. No. 278,462, filed May 6, 1963.

The present invention relates to the preparation of shaped articles formed by binding particles of wood together with various binder compositions. More specifically, the invention concerns the use of certain organic polymeric binder materials in conjunction with wood particles and either with or without an inorganic magnesia-base cementitious binder to provide particle boards having improved physical characteristics.

Wood particle board is prepared by a variety of methods which basically involve the application of pressure and heat to a mixture of wood particles and a binder material to form a cohesive mass. This final particle board product may be of a single or multiple layer construction. The wood particles are generally employed in the form of splinters, chips, flakes, shavings and sawdust which are admixed with an organic or inorganic binder material, e.g. urea-formaldehyde resin or inorganic magnesia-base cements, to provide a particulate, composite mass. This mass is generally formed into a mat which subsequently hardens or "sets" to form a relatively rigid board structure. The formation of this board is usually facilitated by the application of heat and pressure to the mat.

It is an object of the present invention to provide a particle board with improved strength and moisture resistant qualities. It is another object of the invention to provide a particle board having a decorative surface appearance. It is also an object of the invention to provide a method for the manufacture of such particle board. Other objects will become apparent hereinafter as the present invention is more fully described.

The general method of the present invention comprises the steps of pre-treating a quantity of wood particles with a small amount of a suitable synthetic water-soluble polyelectrolyte and then applying to the pre-treated wood particles an inorganic magnesia-base cementitious binder in the form of an aqueous slurry. The resulting polymer-treated wood particle-binder composite is utilized in the manufacture of an improved wood particle board.

In an alternative procedure, the water-soluble polyelectrolyte is added directly to the inorganic magnesia-base binder slurry and the polymer and binder components, combined in this slurry, are sprayed onto the wood particles.

Wood particle boards may also be prepared utilizing only the water-soluble polyelectrolytes as binders or adhesion improvers and without the use of magnesia-base inorganic binders.

Wood particles suitable for use in the present invention are those conveniently employed in the manufacture of particle board. Such particles include a wide variety of mechanically formed wood particles ranging in size from sawdust to relatively large chips, flakes, splinters, shavings and the like. These wood particles, which may be classified according to sizes and types of wood are obtained by mechanically working larger pieces of wood stock.

Polymers suitable for use in the present invention are synthetic water-soluble cationic and anionic polyelectrolytes which contain ionic groups either appended to or forming part of the polymer chain. Representative examples of such polymers include polyalkylenimines, polyalkylenepolyamines, polyvinylbenzyl dialkanol sulfonium halides, alkali metal salts of polyvinylarene sulfonic acids such as sodium polystyrenesulfonate, and the like.

These polymers are incorporated in the inorganic magnesia-base binder composition-wood particle mixture prior to formation of the particle board product. The polymer is usually added to an aqueous slurry of the inorganic binder composition or the wood particles are pre-treated with an aqueous solution of the polyelectrolyte prior to mixing the particles and binder. The pre-treatment is accomplished by any convenient procedure such as immersing, sprinkling, spraying and the like. A preferred procedure involves spraying an aqueous solution of the polymer onto the wood particles as they are agitated as for example in a rotary mixer such as a cement mixer. A similar type of operation may be employed wherein an aqueous mixture of polymer and inorganic binder is sprayed onto the tumbled wood particles. Sufficient quantities of polymer are employed to provide a polymer content in the resulting composite mass of from about 0.15 to 2.0 weight percent. It should be noted that the efficiency of incorporation of the polymer and binder in the composite mass formed will vary when different mixing techniques are utilized. An average loss of about 30 weight percent of the polymer and inorganic binder has been observed in small scale experiments and the initial amounts of these components utilized in preparing the mixture of polymer, inorganic binder and wood particles must be accordingly adjusted to provide the desired content in the composite mass which is utilized, after the pre-treatment step, in subsequent operations which produce the desired particle board.

The binder employed in admixture with the wood particles is selected from a variety of known inorganic magnesia-base materials and mixtures of such materials which display the ability to cure or harden into cements. Examples of these are magnesium oxychloride, magnesium oxybromide and magnesium oxysulfate cements. A preferred inorganic binder is magnesium oxychloride employed at a $MgO:MgCl_2$ mol ratio of about 6:1 and in sufficient quantity to provide about 15 parts by weight of binder solids to 100 parts by weight of dry wood particles in the composite mass resulting from the previously described mixing procedure. The amount of binder employed may be as little as that amount needed to provide 10 weight percent binder solids in the final board product. The use of a low percentage of binder such as this will yield a low cost, low quality board suitable for many purposes. The use of twice this amount of binder will yield a much higher quality and more fire-resistant particle board product.

In the particle board forming operation, measured quantities of the above-described composite mass are placed in a deckle box or spread on metal cauls to form mats which are generally compacted at normal room temperature in a pre-pressing operation. If a single layer board is to be produced, the mat is then subjected to heat and pressure as later described. If, however, a sandwich-type of multi-layer board is desired, a series of mats may be prepared and formed into a multi-layer sandwich structure prior to proceeding with the final pressing operation. It should be noted that, if desired, the polymer-containing wood particle-binder composite may be employed only in certain layers such as the facing layers wherein this composite is most effective in improving the overall characteristics and appearance of the multi-layer particle board. Likewise, the various layers may utilize different types of wood particles as for example where sawdust may be employed to furnish a core layer which is sandwiched between two facing layers containing wood flakes thus providing an attractive appearance while utilizing a lower cost core material.

The composite mass is usually, although not necessarily, compacted prior to the final hot pressing by application of a nominal, uniform pressure to the mat. The compacted mat is then transferred to a hydraulic hot platen press or the equivalent thereof which can be employed to hot press or extrude the mat to provide a particle board.

Molding pressures generally vary within a range of about 125 to 500 p.s.i. depending upon the board density desired, the curing temperature employed and other factors. The temperature may vary from about 240° to 300° F. depending upon the time during which the compacted mass is in contact with the heated platens, the heat transfer efficiencies realized in the operation and like considerations. The pressing time will vary from about 5 to 30 minutes depending upon the temperature and pressure employed. In any event these variables must be carefully controlled to prevent disruption of hydrate formation by the inorganic magnesia-base binder solids or other effects which will result in undue degradation as well as to prevent excessive drying of the particle board product.

It is usually necessary to adjust the moisture content of the polymer-binder-wood particle composite to bring it within desired limits. Depending upon whether the wood particles are to be employed in facing or core layers, the type of forming process and the curing temperatures, times and pressures employed, it is advantageous to maintain the moisture content of the composite mass between about 10 to 25 percent by weight of the dry wood.

Variables to be considered when adjusting the moisture content of a particular composite mass include the initial moisture of the wood particles, the type of wood particles, the thickness of the final board product, the amount of water incorporated in the composite along with the aqueous polymer and binder solution or solutions and the previously mentioned hot press conditions.

In the following examples the measurements of strength qualities of the particles board products were made after the boards were conditioned for 3 days at 75° F. and in 50 percent relative humidity air. Test strips measuring 3½ by 11½ inches were cut from the boards and used to measure the modulus of rupture (flexural strength), hereinafter M.O.R., following the procedure of ASTM designation D-1037, sections 10-19. The internal bond, hereinafter I.B., was measured on 2-inch square samples of the conditioned board following the procedure of sections 27-32 of ASTM designation D-1037. The moisture resistant properties referred to in the examples were determined by measuring the percent volume increase (percent swell) and the percent weight increase (percent absorption) after the particle board had been immersed in water at normal room temperature for 24 hours, following the procedure of sections 69-75 of ASTM Designation D-1037.

The following examples describe completely representative specific embodiments of the present invention. These examples, however, are not to be interpreted as limiting the invention other than as defined in the claims.

All parts expressed in the examples are parts by weight unless otherwise stated.

*Example 1*

A quantity of 870 grams of Douglas-fir flakes, containing approximately 8 weight percent absorbed water, was placed in a 6 cubic foot cement mixer. A quantity of 480 cc. of an aqueous solution containing 3 weight percent polyethylenimine (PEI) was sprayed onto the tumbled flakes by utilizing a hand type insecticide sprayer. After this operation, water entering the mixing chamber with the polymer was removed by tumbling the spray-treated flakes in a current of dry air. These operations provided the wood flakes with an impregnation of approximately 10 grams of PEI since about 30 weight percent of the polymer introduced was not taken up by the flakes. Thus, on a dry basis, about 1.25 weight percent of the treated flakes was PEI.

The treated flakes were then tumbled as before while 133 grams of a 34 weight percent $MgCl_2$ aqueous solution was sprayed onto the flakes. Following this application, a quantity of 114.8 grams of 150 U.S. mesh MgO was sprayed as a dust onto the tumbled flakes and the wet, polymer-binder treated flakes were collected in a deckle box and hand-pressed into a 2-inch thick mat. The loss of binder solids during application to the flakes was approximately 30 weight percent leaving a composite mass comprising approximately 800 parts of dry flakes, 10 parts of PEI, and 112 parts of $MgO$-$MgCl_2$ binder solids. Thus about 14 parts of binder solids per 100 parts of dry flakes was present in a mol ratio of $MgO:MgCl_2$ of about 6:1.

The mat was placed in a hot platen press and pressed at 250° F. for 15 minutes at an average pressure of about 150 p.s.i. to yield a particle board having a thickness of about ⅜ inch. The board showed an M.O.R. value of 4380 p.s.i. and an I.B. value of 187 p.s.i.

The PEI employed in the above example was prepared by heating an aqueous solution containing ethylenimine in the presence of a small amount of a dihaloalkane polymerization initiator to yield a polyethylenimine product. An aqueous solution of this polymer containing 1 weight percent PEI had a viscosity of 1.14 centistokes as measured by use of a modified Ostwald viscometer at a temperature of 100° F.

*Example 2*

Particle boards were prepared following the procedure of Example 1 with the following exceptions. The PEI was mixed with an aqueous slurry of $MgCl_2$ and MgO and the resulting mixture was sprayed onto the tumbled wood flakes in one operation which replaced the individual applications of these three components as described in Example 1. The amount of PEI incorporated in the wood flake-binder-polymer composite mass was equal to 1.4 weight percent of the total weight of polymer and wood flakes. These particle boards were tested as before and showed an M.O.R. value of 4650 p.s.i. and an I.B. value of 189 p.s.i.

*Example 3*

In this example a comparison of particle boards prepared by similar procedures which varied only with respect to inclusion or exclusion of PEI demonstrated the improvement in physical characteristics resulting from the presence of the polyelectrolyte. A series of Douglas-fir flakeboards, 4′ x 4′ x ¼″ in dimension, was prepared by the general method of the previous examples. Theses boards contained a total of 16.4 percent by weight, dry basis, of MgO and $MgCl_2$ in a 6:1 mol ratio $MgO:MgCl_2$. Part of the boards were prepared by employing only inorganic components in the pretreatment of the wood particles while the remainder of the boards were prepared from wood particles which had also been pre-treated with PEI to yield a final board product containing 0.21 weight percent PEI. All boards were formed at a temperature of 250° F. and an average holding pressure of 150 p.s.i. for 15 minutes total press time. The final board density, after conditioning, was about 50 lb./ft.³ Table I, below, shows the improvement in strength and moisture resistance properties resulting from the use of PEI. The values are averages for a number of boards.

TABLE I

| PEI Pre-Treatment | Density, lbs./ft.³ | Strength* | | 24 hr. water soak, percent | |
|---|---|---|---|---|---|
| | | I.B. | M.O.R. | Absorption | Swell |
| None | 48.4 | 129 | 3,630 | 69 | 30.5 |
| 0.21 wt. percent PEI | 52.7 | 168 | 4,150 | 54 | 23.8 |

*Extrapolated to a board density of 50 lbs./ft.³

*Example 4*

Other polyelectrolytes were employed in the procedure of Example 1 and the I.B. and M.O.R. values of boards thus prepared were measured and compared. These results are listed in Table II below. The pre-treatment of the wood flakes utilized a solution of the polymer which provided approximately 0.62 part of polymer per 100 parts of dry wood in the final particle board product. The polyalkylenepolyamine (PAPA) was prepared by the condensation reaction of triethylenetetraamine and ethylene dichloride and the sodium polystyrene sulfonate (SPSS) was the homopolymerization product of the sulfonated monomer which was prepared as taught in U.S. Patent 3,079,430, issued on Feb. 26, 1963. In each case the value given is the average value of several runs.

TABLE II

| Run No. | Polyelectrolyte | I.B., p.s.i. | M.O.R., p.s.i. |
|---|---|---|---|
| A | None | 97 | 2,580 |
| B | PEI | 135 | 3,470 |
| C | PAPA | 189 | 3,990 |
| D | SPSS | 162 | 4,160 |

*Example 5*

A series of particle boards was prepared by following the method of Example 1 with the exceptions of (1) using different types of wood particles and (2) using different amounts of PEI. In Table III below, the amounts of PEI are parts by weight of PEI per 100 parts dry wood.

TABLE III

| Run No. | Type Wood | PEI | I.B. | M.O.R. |
|---|---|---|---|---|
| A | Douglas-fir flakes | 0 | 97 | 2,580 |
| B | do | 0.31 | 110 | 3,750 |
| C | do | 0.62 | 135 | 3,470 |
| D | do | 1.25 | 187 | 4,380 |
| E | do | *2.50 | 173 | 3,090 |
| F | Pine Sawdust | 0 | 79 | 900 |
| G | do | 1.25 | 169 | 1,190 |

*Polyethylenimine darkens the wood flakes as compared to use of inorganic binder alone. This darkening effect provides an attractive variegated surface which becomes more pronounced with increasing amounts of PEI. However, when above 2 weight percent PEI is present, based on wood particle dry weight, the particle board begins to lose strength qualities. This is believed to be due to alkali degradation of the wood.

*Example 6*

The general procedure of Example 1 was followed to prepare a large number of 4 ft. by 16 ft. particle boards of ⅜ inch thickness. Where changes in amounts of materials, contents and conditions from Example 1 were made, they are noted. In all of the particle board prepared in this example, the polymer, MgO and MgCl$_2$ were prepared in a single slurry which was sprayed on tumbled flakes of Douglas-fir. This slurry contained (1) 10.8 parts MgO, (2) 4.2 parts MgCl$_2$, (3) 20 parts of water and (4) the indicated parts and type of polymer per 100 parts of dry wood. In some runs the polymer or MgO-MgCl$_2$ binder was omitted as indicated. The boards produced average 11.4 parts of binder solids with a MgO:MgCl$_2$ mol ratio of 6.6:1. The following tables list various physical characteristics of these boards prepared in accordance with the general procedure of Example 1 but with variations as noted. The pressing operation involved the application of 450 p.s.i. pressure at a temperature of 260° F. for 15 minutes.

The two runs below, Table IV, were identical except that the mat in Run No. 2 was more carefully formed prior to the high pressure-heat compaction which produced the final product.

TABLE IV

| Run No. | Polymer | I.B., p.s.i. | M.O.R., p.s.i. |
|---|---|---|---|
| 1 | 1 part PAPA | 71.5 | 2,815 |
| 2 | do | 91.5 | 3,000 |

The two runs reported in Table V, below, gave boards having approximately equal strength qualities. The use of PAPA yielded a lower viscosity slurry than the PEI and this resulted in somewhat easier mat formation.

TABLE V

| Run No. | Polymer | I.B., p.s.i. | M.O.R., p.s.i. |
|---|---|---|---|
| 3 | 1 Part PEI | 90.0 | 2,800 |
| 4 | 1 part PAPA | 91.5 | 3,000 |

The results in Table VI, below, indicate that the use of a lower viscosity polymer, i.e. Run 6, enables better felting of the mat prior to the press operation which results in a higher density board product.

TABLE VI

| Run No. | Polymer | Board density, lbs./ft.³* |
|---|---|---|
| 5 | 1 part PEI | 40.8 |
| 6 | 1 part PAPA | 47.5 |
| 7 | 1 part PEI | 40.4 |

* Density on day of board manufacture—no conditioning.

Omission of the inorganic binder demonstrates that the polymer alone may be employed to form a particle board product although strength qualities are lower. In addition, the use of inorganic binder improves fire resistance of the board.

TABLE VII

| Run No. | Polymer | I.B., p.s.i. | M.O.R., p.s.i. |
|---|---|---|---|
| 8 | 0.75 part PAPA, no MgCl$_2$ or MgO. | 77 | 2,500 |
| 9 | 1 part PAPA with inorganic binder. | 91.5 | 3,000 |

*Example 7*

Various commercially available boards were compared with boards prepared in accordance with Example 1 in a high temperature exposure test. The following results were noted when these various boards were maintained at 167° F. and 6% R.H.

(A) Particle boards prepared by utilizing urea-formaldehyde binders are more susceptible to these conditions than boards prepared in accordance with the present invention. Urea-formaldehyde boards of approximately 45 lbs./ft.³ density began to weaken after 3 to 5 weeks exposure while boards prepared by the method of the present invention showed an increase in both internal bond and M.O.R. values after a similar period of exposure.

(B) At high humidity levels, e.g. about 95% relative humidity, the urea-formaldehyde boards support heavy mold growth with attendant loss of strength at the end of 3 weeks. No mold growth was noticeable on the particle boards of the present invention which were simultaneously exposed to the same conditions.

*Example 8*

The flame resistance qualities of particle boards prepared as in Example 1 by the method of the present invention were tested in accordance with ASTM Test E84–59T, "Tentative Method of Test for Surface Burning Characteristics of Building Materials." A flame spread rating of approximately 62 was observed which is recognized as a Class II fire hazard rating by many building codes. There was no evidence of weakening of the bond at high temperatures and the internal bond was fully maintained until the wood flakes were severely charred.

Example 9

PEI and PAPA were compared with a polyvinylbenzyl diethanol sulfonium chloride polymer prepared by reacting thiodiglycol with chloromethylated polystyrene. The strength and moisture resistance qualities are tabulated in Table VIII, below. The general procedure of Example 1 was followed.

TABLE VIII

| Run No. | Polymer | I.B. | M.O.R. | Percent swell | Percent weight gain |
|---|---|---|---|---|---|
| A | None | 104 | 2,575 | 36 | 64 |
| B | 1 part sulfonium polymer (in binder slurry) | 132 | 2,490 | 9.5 | 36 |
| C | 1 part PEI (in binder slurry) | 180 | 3,000 | 8.0 | 30 |
| D | ½ part sulfonium polymer (pretreat) | 177 | 3,230 | 14 | 46 |
| E | ½ part PAPA (pretreat) | 177 | 3,420 | 14 | 45 |

In the above table, Table VIII, the polymer in Runs B and C was applied to the wood particles in admixture with the binder while in Runs D and E the wood particles were treated with the polymer prior to the binder application. The lower internal bond value of boards prepared in Run B (where 1 part of sulfonium polymer was employed) as compared to Run D (where ½ part sulfonium polymer was employed) was due to poorer distribution of polymer onto the wood particles and poorer mat formation. This resulted from the higher viscosity of the binder-polymer slurry which produced drops of spray too large for effectively contacting the wood particle surfaces.

It is important to note that various other additives may be employed to provide special particle board characteristics when desired. Thus various waxes are frequently added in the formulation of particle board to improve moisture resistance, as measured by the 24-hour water immersion test, although the resultant board strength is generally impaired by wax addition.

Example 10

The additives mentioned in the previous examples are water-soluble polyelectrolytes and as such they retain some degree of susceptibility to moisture in the board product. This is evident from observing the results of a 24-hour immersion of boards containing these polymers in cold water.

It has been found that the cationic polyelectrolytes such as PEI or PAPA can be immobilized following their application to the wood particles by addition of a smaller amount of an anionic water-soluble polyelectrolyte, such as sodium polystyrene sulfonate, hereafter SPSS, to the treated wood. The direct mixing of these two types of water-soluble polyelectrolytes in aqueous solution produces an insoluble gummy product. It is presumed that the same result occurs within the board product, as it is formed in the hot press, after separate, successive applications of cationic and anionic polyelectrolytes to the wood particles. Improved results for the 24-hour cold water immersion test are shown for this method not only when an inorganic magnesia-base binder composition is also employed but also when such inorganic binder composition is omitted. A comparison of several types of pre-treatment is shown in Table IX below.

TABLE IX

| Run No. | Pre-Treatment | 24-hour cold water soak, percent | |
|---|---|---|---|
| | | Absorbed | Swell |
| A | 2% PAPA (only) | 71 | 49 |
| B | 2% PAPA followed by 0.2% SPSS | 47 | 14.5 |
| C | 0.5% PAPA in 15% MgO-MgCl₂ system | 47 | 14 |
| D | 0.5% PAPA in 15% MgO-MgCl₂, followed by 0.05% SPSS | 34 | 12 |

Example 11

The general utility of these synthetic water-soluble polyelectrolytes as adhesion improvers in the wood products field is shown by the following experimental results.

(A) The utility of these water-soluble polyelectrolytes in preparing hardboard products was investigated. Starting with a 0.6% aqueous slurry of beaten kraft fibers, two boards were prepared, one of which contained 1.6% PAPA which had been introduced into the 0.6% fiber slurry. In each case, the fibers were collected on a wire screen which allowed the bulk of the water to be drained off. The resulting mat was hot pressed at 300° F. for 15 minutes at an average pressure of 300 p.s.i. Results for the conditioned board products are given in Table X below.

TABLE X

| Board | Density, lb./ft.³ | I.B., p.s.i. | 24-hour cold water soak, percent | |
|---|---|---|---|---|
| | | | Absorbed | Swell |
| Blank (no polymer) | 62.3 | 223 | 131 | 91 |
| 1.6% PAPA | 64.6 | 465 | 69 | 47 |

(B) Molded sawdust disks were prepared as one-inch diameter "buttons." A pressure of 2000 p.s.i. was used at a temperature of about 250° F. to form these disks. It was demonstrated that disks from sawdust alone would soon disintegrate when immersed in water. A disk from sawdust containing 2% by weight of PAPA did not disintegrate, although it swelled 23% in thickness during a 72 hour immersion period.

As a general finding, when adjacent fibers are to be bonded, as required for paper, fiberboard, hardboard, and particle board formation, the water-soluble polyelectrolytes of the present invention are highly effective as additives to promote strength and moisture resistance. On the other hand, when an intervening glue line is required, such as in plywood, wood excelsior-cement board, or laminated timber, these polymers are generally ineffective.

I claim:

1. An improved wood particle board which comprises a wood particle-inorganic magnesia-base cementitious binder composition also containing from about 0.15 to 2.5 parts by weight per 100 parts dry wood of a synthetic water-soluble polyelectrolyte selected from the group consisting of polyalkylenimines, polyalkylenepolyamines, polyvinylbenzyl dialkanol sulfonium halides, and alkali metal salts of polyvinylarene sulfonic acids.

2. The particle board of claim 1 wherein said polyalkylenimine is polyethylenimine.

3. The particle board of claim 1 wherein said polyalkylenepolyamine is the condensation reaction product of triethylenetetraamine and ethylene dichloride.

4. The particle board of claim 1 wherein said polyvinylbenzyl dialkanol sulfonium halide is polyvinylbenzyl diethanol sulfonium chloride.

5. The particle board of claim 1 wherein said polyvinylarene sulfonic acid alkali metal salt is sodium polystyrene sulfonate.

6. In the method of preparing wood particle board by the application of heat and pressure to a composite mass of wood particles and an inorganic magnesia-base cementitious material, the improvement which comprises also including in said composite mass from about 0.15 to 2.5 parts by weight per 100 parts by weight dry wood of a synthetic water-soluble polyelectrolyte selected from the group consisting of polyalkylenimines, polyalkylenepolyamines, polyvinylbenzyl dialkanol sulfonium halides, and alkali metal salts of polyvinylarene sulfonic acids.

7. An improved wood particle board which comprises a wood particle-inorganic magnesia-base cementitious binder composition also containing
   (a) from about 0.15 to 2.5 parts by weight per 100 parts dry wood of a synthetic water-soluble cationic polyelectrolyte selected from the group consisting of polyalkylenimines, polyalkylenepolyamines, and polyvinylbenzyl dialkanol sulfonium halides, and (b) in admixture therewith from about 0.02 to 0.5 part by weight per 100 parts dry wood of a synthetic water-soluble alkali metal salt of a polyvinylarene sulfonic acid anionic polyelectrolyte.

8. The particle board of claim 7 wherein said cationic polyelectrolyte is a polyalkylenepolyamine and said anionic polyelectrolyte is sodium polystyrene sulfonate.

9. In the method of preparing wood particle board by the application of heat and pressure to a composite mass of wood particles and an inorganic magnesia-base cementitious material, the improvement which comprises the treatment of said wood particles with both a cationic and an anionic water-soluble polyelectrolyte prior to admixing the thus treated wood particles with said inorganic magnesia-base cementitious material, said cationic and anionic water-soluble polyelectrolytes being selected from the group consisting of polyalkylenimines (A), polyalkylenepolyamines (B), polyvinylbenzyl dialkanol sulfonium halides (C), and alkali metal salts of polyvinylarene sulfonic acids (D), and said treatment being carried out in a step-wise manner wherein said wood particles are first treated with from about 0.15 to 2.5 parts by weight per 100 parts dry wood of a cationic polyelectrolyte (A), (B), or (C) from said group of water-soluble polyelectrolytes and then subsequently treated with from about 0.02 to 0.5 part by weight per 100 parts of dry wood of an anionic polyelectrolyte (D) from said group of water-soluble polyelectrolytes.

10. A wood particle board which comprises a wood particle-binder composition, said binder (a) consisting of a synthetic water-soluble polyelectrolyte selected from the group consisting of polyalkylenimines, polyalkylenepolyamines, polyvinylbenzyl dialkanol sulfonium halides, and alkali metal salts of polyvinylarene sulfonic acids, and (b) being present in an amount which provides from about 0.5 to 4 parts by weight of binder per 100 parts by weight dry wood.

11. The particle board of claim 10 wherein said binder consists of a mixture of a polyalkylenepolyamine and sodium polystyrene sulfonate, the weight ratio of said polyalkylenepolyamine to said sodium polystyrene sulfonate being about 10.

12. The particle board of claim 10 wherein said polyalkylenimine is polyethylenimine.

13. The particle board of claim 10 wherein said polyalkylenepolyamine is the condensation reaction product of triethylenetetraamine and ethylene dichloride.

No references cited.

WILLIAM H. SHORT, *Primary Examiner.*

J. NORRIS, *Assistant Examiner.*